Patented June 4, 1940

2,203,230

UNITED STATES PATENT OFFICE 2,203,230

PROCESS FOR THE MANUFACTURE OF CONSERVING ICE

Paul Nitsche, Dresden, Germany

No Drawing. Application June 14, 1939, Serial No. 279,029. In Germany May 25, 1937

4 Claims. (Cl. 62—172)

In order to protect easily perishable food, such as fish or the like against decomposition by bacteria the food is either put between layers of water ice or packed into the latter.

It may take weeks until this iced food stuff is consumed, during which time the food is exposed to the activity of the bacteria.

Noxious and pernicious changes caused by decomposition will nevertheless occur even if the temperatures are kept low by means of the water ice.

It has consequently been proposed to improve the conserving quality of the water ice by adding conserving or preserving means.

Thus, for instance, there were added hydrogen peroxide, permanganate, hypochlorite, formaldehyde and the like.

An obstacle when using these additional means consists in that during the freezing of the water said easily soluble additions will tend to increase in concentration towards the interior of the ice blocks, and decrease in concentration towards the exterior whereby the effect of said additional means is diminished.

It has now been found, that a practically homogeneous mixture within the water ice will be obtained when formaldehyde or its polymers are used in the presence of protecting colloids, absorbing means, or adsorbing means. Said means will absorb or adsorb the formaldehyde and will not freeze out, so that the preservative will remain equally distributed throughout the ice.

Such protecting colloids may be, for instance, of starch, agar-agar, alkylcellulose, or methyl-cellulose.

It will also be possible to use finely distributed coal or other gas absorbing or adsorbing means.

Said ice mixtures are, even in a dilution of 1:2000 still so strongly active, that any development or growth of bacteria will be checked and existing germs be killed. The preservative will only be delivered very slowly from the compound containing the absorption means during the melting of the ice. The melting water formed conserves and preserves the food stuff and still retains its conserving properties as collected water.

The freezing time will not be prolonged by said additional means nor will the freezing point of the ice be unfavourably influenced.

Example 1

To 1000 kg. water there are added .5 kg. of a 40% formaldehyde and 10 kg. of a starch solution which contains .5 kg. starch. This mixture is then frozen.

Example 2

To 1000 kg. water there are added .5 kg. of a 40% formaldehyde and 10 kg. of a solution which contains .1 kg. alkylcellulose. This mixture is then frozen.

What I claim is:

1. The method of manufacturing antiseptic ice comprising the steps of adding to water a preservative selected from the group of compounds consisting of formaldehyde and its polymers and an homogenizing agent selected from the group consisting or starch, agar-agar, alkylcellulose, methyl-cellulose and carbon particles, and freezing the resulting mixture.

2. The method of manufacturing a substantially homogeneous antiseptic ice comprising the steps of adding to 1000 parts of water approximately ½ part of a 40% formaldehyde solution and approximately 10 parts of a starch solution containing approximately ½ part of starch, and freezing the resulting mixture.

3. The method of manufacturing a substantially homogeneous antiseptic ice comprising the steps of adding to 1000 parts of water approximately ½ part of a 40% formaldehyde solution and approximately 10 parts of a solution containing approximately $\frac{1}{10}$ part of alkylcellulose, and freezing the resulting mixture.

4. As an article of manufacture, a substantially homogeneous antiseptic ice comprising a crystallized mixture of water, a preservative selected from the group consisting of formaldehyde and its polymers, and an homogenizing agent selected from the group consisting of starch, agar-agar, alkylcellulose, methyl-cellulose, and carbon particles.

PAUL NITSCHE.